(12) United States Patent
Huang et al.

(10) Patent No.: US 10,948,660 B2
(45) Date of Patent: Mar. 16, 2021

(54) CONNECTING PIECE AND OPTICAL FIBER CONNECTOR

(71) Applicant: Huawei Technologies Co., Ltd., Shenzhen (CN)

(72) Inventors: Xuesong Huang, Shenzhen (CN); Wenxin Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 207 days.

(21) Appl. No.: 15/631,867

(22) Filed: Jun. 23, 2017

(65) Prior Publication Data
US 2017/0299817 A1    Oct. 19, 2017

Related U.S. Application Data

(63) Continuation of application No. PCT/CN2014/094975, filed on Dec. 25, 2014.

(51) Int. Cl.
 *G02B 6/38* (2006.01)
 *G02B 6/44* (2006.01)
 *G02B 6/36* (2006.01)

(52) U.S. Cl.
CPC .............. *G02B 6/38* (2013.01); *G02B 6/36* (2013.01); *G02B 6/3887* (2013.01); *G02B 6/44* (2013.01);
(Continued)

(58) Field of Classification Search
CPC . G02B 6/38; G02B 6/44; G02B 6/388; G02B 6/36; G02B 6/3821; G02B 6/3849; G02B 6/3825; G02B 6/3893
See application file for complete search history.

(56) References Cited

U.S. PATENT DOCUMENTS 4,339,171 A * 7/1982 Makuch ................. G02B 6/383
                                                                  385/87
4,974,925 A * 12/1990 Troutman ............ G02B 6/2558
                                                                  385/99
(Continued)

FOREIGN PATENT DOCUMENTS

CN          101299085 A        11/2008
CN          201449482 U  *     5/2010
(Continued)

OTHER PUBLICATIONS

Machine Translation and Abstract of Chinese Publication No. CN102928933, Feb. 13, 2013, 4 pages.
(Continued)

*Primary Examiner* — Peter Radkowski
(74) *Attorney, Agent, or Firm* — Conley Rose, P.C.

(57) ABSTRACT

An optical fiber connector, including a flat drop cable, a connector sub-assembly comprising one end fastened to the flat drop cable, a coupling shaft, which is step-shaped and includes a flange and a plastic body, where one end of the plastic body is provided with an internal thread configured to be connected to an external thread of the connector sub-assembly, and the flange is provided with at least one hook groove, an inner sleeving element configured to accommodate the connector sub-assembly, where one end of the inner sleeving element is higher than an end surface of a ceramic ferrule of the connector sub-assembly, and the inner sleeving element is provided with an open slot, and an outer sleeving element, where the outer sleeving element is configured to sleeve the inner sleeving element, and capable of sliding forwards and backwards relative to the inner sleeving element.

20 Claims, 10 Drawing Sheets

(52) U.S. Cl.
CPC .......... *G02B 6/3821* (2013.01); *G02B 6/3825* (2013.01); *G02B 6/3849* (2013.01); *G02B 6/3893* (2013.01)

(56) References Cited

U.S. PATENT DOCUMENTS

| | | | | |
|---|---|---|---|---|
| 5,461,690 A * | 10/1995 | Lampert | ............. | G02B 6/3807 385/100 |
| 5,475,782 A * | 12/1995 | Ziebol | ................ | G02B 6/3887 385/69 |
| 5,481,634 A * | 1/1996 | Anderson | ........... | G02B 6/3893 385/76 |
| 5,844,860 A * | 12/1998 | Miller | .................... | G01V 1/201 367/154 |
| 6,238,104 B1 * | 5/2001 | Yamakawa | .......... | G02B 6/3869 385/81 |
| 6,461,057 B2 * | 10/2002 | Chen | .................... | G02B 6/3869 385/76 |
| 6,565,261 B1 * | 5/2003 | Uchiyama | ........... | G02B 6/3889 385/139 |
| 6,779,750 B1 * | 8/2004 | Couchey | ................ | B65H 65/00 242/125.1 |
| 7,114,227 B2 * | 10/2006 | Lin | ........................ | B65H 75/28 28/290 |
| 7,228,047 B1 * | 6/2007 | Szilagyi | .............. | G02B 6/3878 385/134 |
| 7,467,896 B2 * | 12/2008 | Melton | ................ | G02B 6/3849 385/78 |
| 7,708,469 B2 * | 5/2010 | Liu | ...................... | G02B 6/3887 385/55 |
| 7,770,272 B2 * | 8/2010 | Lin | ........................ | B65H 75/28 242/172 |
| 9,778,427 B2 * | 10/2017 | Isenhour | ............. | G02B 6/4284 |
| 2003/0063868 A1 * | 4/2003 | Fentress | .............. | G02B 6/3825 385/78 |
| 2006/0010927 A1 * | 1/2006 | Lin | ........................ | B65H 75/28 66/131 |
| 2008/0050072 A1 * | 2/2008 | Durrant | .................... | G02B 6/32 385/74 |
| 2008/0080817 A1 * | 4/2008 | Melton | ................ | G02B 6/3849 385/81 |
| 2008/0273855 A1 * | 11/2008 | Bradley | ............... | G02B 6/3849 385/139 |
| 2009/0305542 A1 * | 12/2009 | Masuzaki | ........... | H01R 13/625 439/335 |
| 2010/0254659 A1 * | 10/2010 | Anderson | ........... | G02B 6/3887 385/54 |
| 2011/0075983 A1 * | 3/2011 | Fan | ...................... | G02B 6/3887 385/135 |
| 2012/0141075 A1 * | 6/2012 | Griffiths | ............... | G02B 6/4465 385/78 |
| 2013/0209051 A1 * | 8/2013 | Wu | ....................... | G02B 6/4472 385/135 |
| 2015/0260926 A1 * | 9/2015 | Wu | ..................... | G02B 6/3869 385/60 |
| 2016/0299298 A1 * | 10/2016 | Huang | ................ | G02B 6/3825 |

FOREIGN PATENT DOCUMENTS

| | | | |
|---|---|---|---|
| CN | 102460259 A | | 5/2012 |
| CN | 102540373 A | * | 7/2012 |
| CN | 102870023 A | | 1/2013 |
| CN | 202661679 U | | 1/2013 |
| CN | 102928933 A | | 2/2013 |
| CN | 202995085 U | | 6/2013 |
| CN | 102540373 B | * | 3/2014 |
| CN | 105339822 A | | 2/2016 |
| EP | 0179563 A2 | | 4/1986 |
| EP | 2894501 A1 | | 7/2015 |
| ES | 1110189 U | | 5/2014 |
| GB | 2164761 A | | 3/1986 |
| JP | H09329730 A | | 12/1997 |
| JP | 2000241662 A | | 9/2000 |
| JP | 2005514651 A | | 5/2005 |
| JP | 2009128471 A | | 6/2009 |
| JP | 4336610 B2 | | 9/2009 |
| JP | 2009294343 A | | 12/2009 |
| JP | 2011525695 A | | 9/2011 |
| JP | 2015537255 A | | 12/2015 |
| KR | 100850925 B1 | | 8/2008 |
| WO | 03058314 A1 | | 7/2003 |

OTHER PUBLICATIONS

Machine Translation and Abstract of Japanese Publication No. JP2000241662, Sep. 8, 2000, 6 pages.
Machine Translation and Abstract of Japanese Publication No. JP2009128471, Jun. 11, 2009, 6 pages.
Machine Translation and Abstract of Japanese Publication No. JP2015537255, Dec. 24, 2015, 9 pages.
Machine Translation and Abstract of Japanese Publication No. JPH09329730, Dec. 22, 1997, 9 pages.
Foreign Communication From a Counterpart Application, Japanese Application No. 2017-534247, Japanese Notice of Rejection dated Jun. 5, 2018, 4 pages.
Foreign Communication From a Counterpart Application, Japanese Application No. 2017-534247, English Translation of Japanese Notice of Rejection dated Jun. 5, 2018, 5 pages.
Foreign Communication From a Counterpart Application, European Application No. 14908786.6, Extended European Search Report dated Oct. 18, 2017, 9 pages.
Machine Translation and Abstract of Chinese Publication No. CN202661679, Jan. 9, 2013, 6 pages.
Machine Translation and Abstract of Chinese Publication No. CN202995085, Jun. 12, 2013, 5 pages.
Machine Translation and Abstract of Korean Publication No. KR100850925, Aug. 7, 2008, 16 pages.
Foreign Communication From a Counterpart Application, Chinese Application No. 201480004974.5, Chinese Search Report dated Jan. 18, 2017, 2 pages.
Foreign Communication From a Counterpart Application, Chinese Application No. 201480004974.5, Chinese Office Action dated Feb. 3, 2017, 5 pages.
Foreign Communication From a Counterpart Application, PCT Application No. PCT/CN2014/094975, English Translation of International Search Report dated Sep. 24, 2015, 3 pages.
Foreign Communication From a Counterpart Application, PCT Application No. PCT/CN2014/094975, English Translation of Written Opinion dated Sep. 24, 2015, 5 pages.

* cited by examiner

CONNECTING PIECE AND OPTICAL FIBER CONNECTOR

CROSS-REFERENCE TO RELATED APPLICATION

This application is a continuation of International Patent Application No. PCT/CN2014/094975 filed on Dec. 25, 2014, which is hereby incorporated by reference in its entirety.

TECHNICAL FIELD

The present disclosure relates to the field of optical communications, and in particular, to a connecting piece and an optical fiber connector.

BACKGROUND

An optical fiber connector assembly is a component used to connect optical cables, connect an optical cable and an optic-to-electric component, and connect optic-to-electric components in an optical fiber communications system. The optical fiber connector assembly precisely interconnects two optical fiber end surfaces that need to be connected such that photon energy output by a transmit optical fiber can be coupled to a receive optical fiber to an utmost extent.

In a process of routing a drop cable in a fiber to the home (FTTH) network, one method is to perform splicing, that is, an optical fiber terminal corresponding to each home is allocated in a fiber division box that is located at a connectorised fiber distribution point (CFDP), the optical fiber terminal and a drop cable of each home are spliced in the fiber division box using an optical fiber splicer, and then the drop cable is routed to each home. At the other end of the drop cable, field splicing also needs to be performed in order to connect the drop cable to a customer terminal box (at Customer Splicing Point (CSP)) of each home. The method has the following disadvantages. A dedicated optical fiber splicing device is required, a requirement on skills of operating personnel is relatively high, and an entire process of routing a drop cable takes a relatively long time. Another method is to use a field connector product, that is, a to-be-connected optical fiber in a distribution optical cable is terminated first and connected to one end of an adapter, and for a user to access a network, a field-made connector terminates the drop cable and connects the drop cable to the other end of the adapter such that the user accesses the network. The drop cable is then routed to each home. At the other end of the drop cable, a field connector is also disposed in order to connect the drop cable to a customer terminal box of each home. In this method, although the splicer is not used, the field connector has problems of large insertion loss and low reliability, particularly, after the field connector is used for a period of time, problems that the insertion loss becomes larger and a field success rate is low occur frequently.

An optical fiber connectorised product can resolve these problems well. The connectorising refers to that a drop cable is terminated in a factory, and optical, mechanical, environmental, and other performance tests are performed on the drop cable. Two ends of the drop cable in the optical fiber connectorised product are equipped with optical fiber sub-assemblies, and fiber adapters that match the optical fiber sub-assemblies are also disposed in a corresponding fiber division box and CSP. In a process of routing a drop cable, it is only required to insert the optical fiber sub-assemblies at the two ends of the drop cable into the fiber adapters in the corresponding fiber division box and customer terminal box.

The optical fiber connectorised product can eliminate a damage or safety impact, which may be caused by various uncertain factors on an optical fiber link to an utmost extent in design, construction, and use of an optical fiber network, ensure system security, meet a design requirement, and also reduce time and devices for field construction.

Some other approaches provides an optical fiber connector, as shown in FIG. 1. For a lock structure of the optical fiber connector and an adapter, a single threaded connection locking manner is used, and during lock and removal, it is required to twist in a circle many times, and the operation is inconvenient. Moreover, in the single threaded connection locking manner, consistency in lock effects cannot be ensured due to different manual tightening forces of different operating personnel, and a threaded connection easily loosens after long-time vibration, thereby affecting reliability of a connector.

SUMMARY

In view of this, embodiments of the present disclosure provide an optical fiber connector that supports plug-and-play, which resolves a technical problem in the other approaches that threaded connection easily loosens and affects reliability.

According to a first aspect, an embodiment of the present disclosure provides an optical fiber connector, including a flat drop cable, a connector sub-assembly, where one end of the connector sub-assembly is fastened to the flat drop cable, a coupling shaft, where the coupling shaft is step-shaped and includes a flange and a plastic body, where one end of the plastic body is provided with an internal thread that is configured to be connected to an external thread of the connector sub-assembly, and the flange is provided with at least one hook groove, where the hook groove is configured to fasten a strength member of the flat drop cable in a mechanical crimping manner, an elastic component, where the elastic component sleeves the coupling shaft, and one end of the elastic component abuts on a shaft shoulder that is of the coupling shaft and is close to the connector sub-assembly, an inner sleeving element configured to accommodate the connector sub-assembly, where one end of the inner sleeving element is higher than an end surface of a ceramic ferrule, and the inner sleeving element is provided with an open slot such that a cross section of the inner sleeving element is C-shaped, and an outer sleeving element, where the outer sleeving element sleeves the inner sleeving element, and is capable of sliding forwards and backwards relative to the inner sleeving element, the outer sleeving element is of a step-shaped circular tube structure, and one end of the outer sleeving element forms an inner shaft shoulder inwards, which is configured to abut on the other end of the elastic component, and an inner wall of the outer sleeving element is provided with at least one protruding projection that is configured to buckle with an adapter when the optical fiber connector is plugged into the adapter.

With reference to the first aspect, in a first possible implementation manner of the first aspect, the coupling shaft is sleeved by an O-ring having a sealing function.

With reference to the first aspect or the first possible implementation manner of the first aspect, in a second possible implementation manner of the first aspect, the coupling shaft is further provided with a groove configured to mount the O-ring.

With reference to either one of the possible implementation manners of the first aspect, in a third possible implementation manner of the first aspect, the coupling shaft is further provided with a chamfered plane, and the chamfered plane is configured to clamp a wrench when threads are tightened.

With reference to any one of the possible implementation manners of the first aspect, in a fourth possible implementation manner of the first aspect, the coupling shaft is further provided with a second groove, and the second groove is configured to mount a snap ring positioning the outer sleeving element.

With reference to the fourth possible implementation manner of the first aspect, in a fifth possible implementation manner of the first aspect, the optical fiber connector further includes a sealing tube, and the sealing tube is of an elastic material and configured to seal the flat drop cable.

With reference to the fourth or fifth possible implementation manner of the first aspect, in a sixth possible implementation manner, an outer surface of the sealing tube is cylindrical, and a cross section of a bore of the sealing tube is 8-shaped.

With reference to the fourth or fifth possible implementation manner of the first aspect, in a seventh possible implementation manner of the first aspect, an outer surface of the flat drop cable is coated with a layer of sealant, the flat drop cable is sleeved by the sealing tube, and a sealing ring sleeves the sealing tube in order to fasten the sealing tube and the flat drop cable.

With reference to the third possible implementation manner of the first aspect, in an eighth possible implementation manner of the first aspect, the optical fiber connector further includes a dustproof cap, the dustproof cap is connected to an optical fiber connector body using a connecting rope, and an outer surface of the dustproof cap is provided with at least one chute, which is configured to allow the projection to slide into the chute when the optical fiber connector is plugged into the dustproof cap in order to implement locking.

According to a second aspect, a connecting piece used in an optical fiber connector is provided, where the connecting piece includes a plastic body and a flange, the flange and the plastic body form an integral part by means of injection molding, one end of the plastic body is provided with a threaded hole that is configured to threaded to an element fitting the connecting piece, and at least one side of the flange is provided with a hook groove that is configured to hook a strength member of a flat drop cable, where the hook groove is an opening formed by cutting the flange and having an arc-shaped edge.

With reference to the second aspect, in a first possible implementation manner of the second aspect, a bottom of the opening is located in the middle of the flange.

With reference to the second aspect or the first possible implementation manner of the second aspect, in a second possible implementation manner of the second aspect, the bottom of the opening and a circumference of the flange constitute a straight line or an arc.

With reference to either one of the possible implementation manners of the second aspect, in a third possible implementation manner of the second aspect, the plastic body is further provided with a first groove, and the first groove is configured to mount an O-ring having a sealing function.

With reference to any one of the possible implementation manners of the second aspect, in a fourth possible implementation manner of the second aspect, the connecting piece further includes a second groove, and the second groove is configured to mount a snap ring sleeving the connecting piece.

With reference to any one of the possible implementation manners of the second aspect, in a fifth possible implementation manner of the second aspect, the plastic body is further provided with a chamfered plane, and the chamfered plane is configured to clamp a wrench when threads are tightened.

In the optical fiber connector provided in the embodiments of the present disclosure, a low-cost flat drop cable is used, which can achieve a stretching resistance of 100 Newton (N) and implement an Ingress Protection Rating of IP67, and can be applied to an outdoor environment. Moreover, the optical fiber connector provided in the embodiments of the present disclosure implements plug-and-play and is easily operated, auxiliary alignment design provides more convenience to a field operation, and time for mounting and dismounting of a connector is shorter than time for mounting and dismounting of an ordinary thread connector. Further, the optical fiber connector provided in the embodiments of the present disclosure has good anti-vibration and anti-loosening effects, thereby improving long-time reliability of the connector. Lastly, the optical fiber connector provided in the embodiments of the present disclosure is provided with a ferrule-protected structure that prevents an end surface of the ferrule from coming into contact with another component, thereby protecting the end surface of the ferrule from being polluted, or protects, during an accidental fall, the ferrule from being damaged due to a crash.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
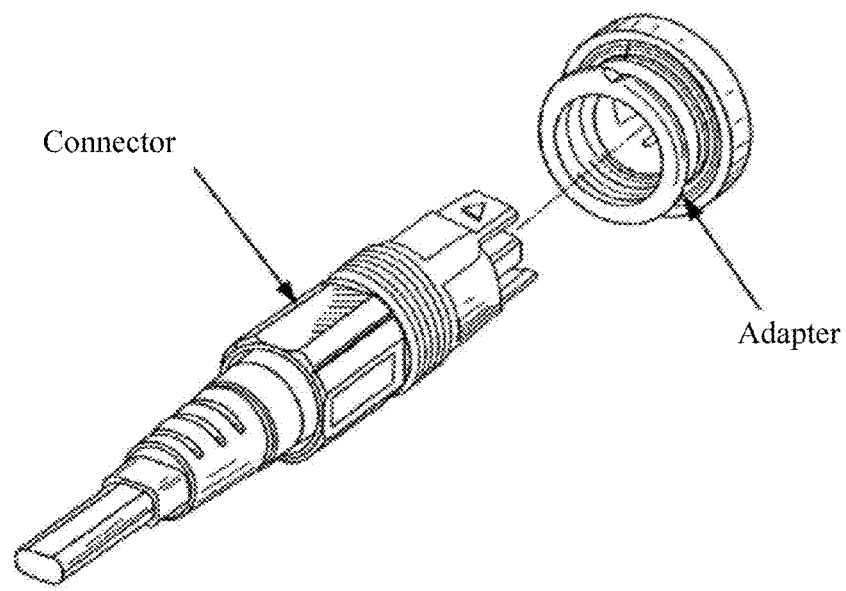
FIG. 1 is a schematic structural diagram of an optical fiber connector.
Figure 2:
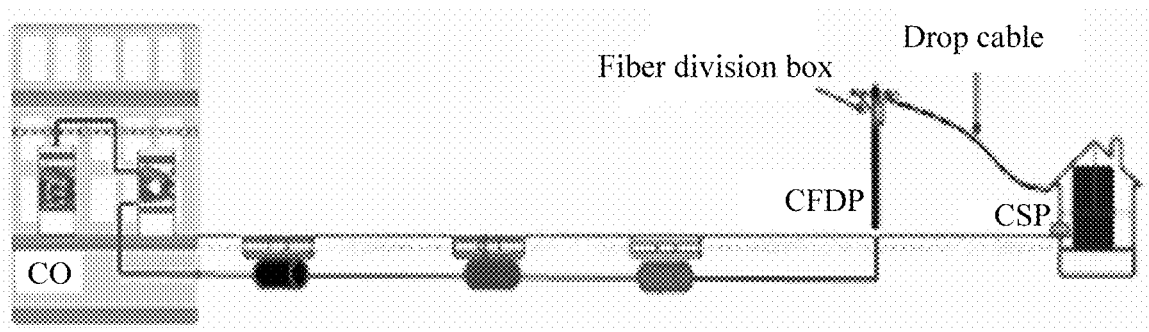
FIG. 2 is a schematic structural diagram of an FTTH network according to an embodiment of the present disclosure.

FIG. 2 shows a part of a fiber to the x (FTTx) access network. An FTTx may be an FTTH, a fiber to the curb (FTTC), a fiber to the premises (FTTP), a fiber to the node or neighborhood (FTTN), a fiber to the office (FTTO), or a fiber to the service area (FTTSA). In FIG. 2, an FTTH network is used as an example. From a downstream of a central office (CO), the FTTH includes a feeder link, a first 1:N splitter, a distribution link, a second 1:N splitter, and at least one branch link. In an embodiment of the present disclosure, an optical fiber connector assembly applied to an outdoor environment is applicable to the foregoing branch link. Although the FTTH network is used as an example in this embodiment of the present disclosure, another network structure may also be used, such as an FTTC, FTTP, FTTN, FTTO, or FTTSA network.

Figure 3:
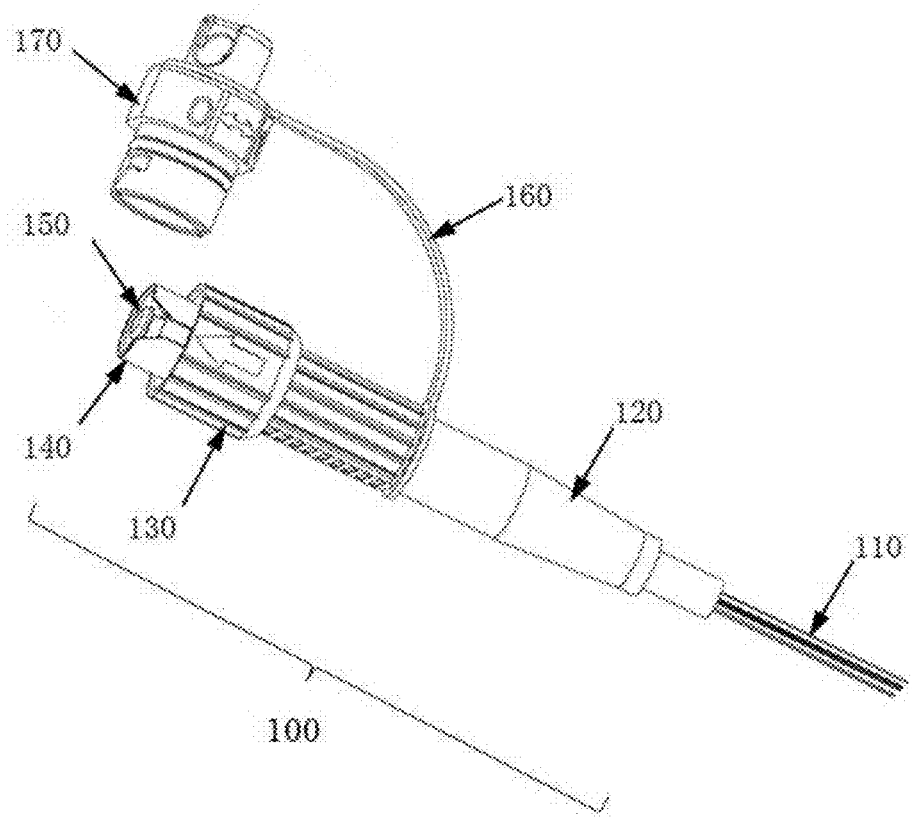
FIG. 3 is a schematic structural diagram of an optical fiber connector according to an embodiment of the present disclosure.

An optical fiber connector provided in an embodiment of the present disclosure is shown in FIG. 3. The optical fiber connector 100 includes a flat drop cable 110, a rear retainer 120, an outer sleeving element 130, an inner sleeving element 140, a connector sub-assembly 150, a connecting rope 160, and a dustproof cap 170. The flat drop cable 110, the rear retainer 120, the outer sleeving element 130, the inner sleeving element 140, and the connector sub-assembly 150 form an optical fiber connector body 100. The following standard connector sub-assembly may be used as the connector sub-assembly 150, such as a Lucent connector (LC), a square connector (SC), a miniature unit connector (MU), a Multi-fiber Push On (MPO) connector, or a ferrule connector (FC). In this embodiment of the present disclosure, the connector sub-assembly 150 is of an SC type is used as an example for description. Certainly, the present disclosure is also applicable to the foregoing listed other standard connectors.

Figure 4:
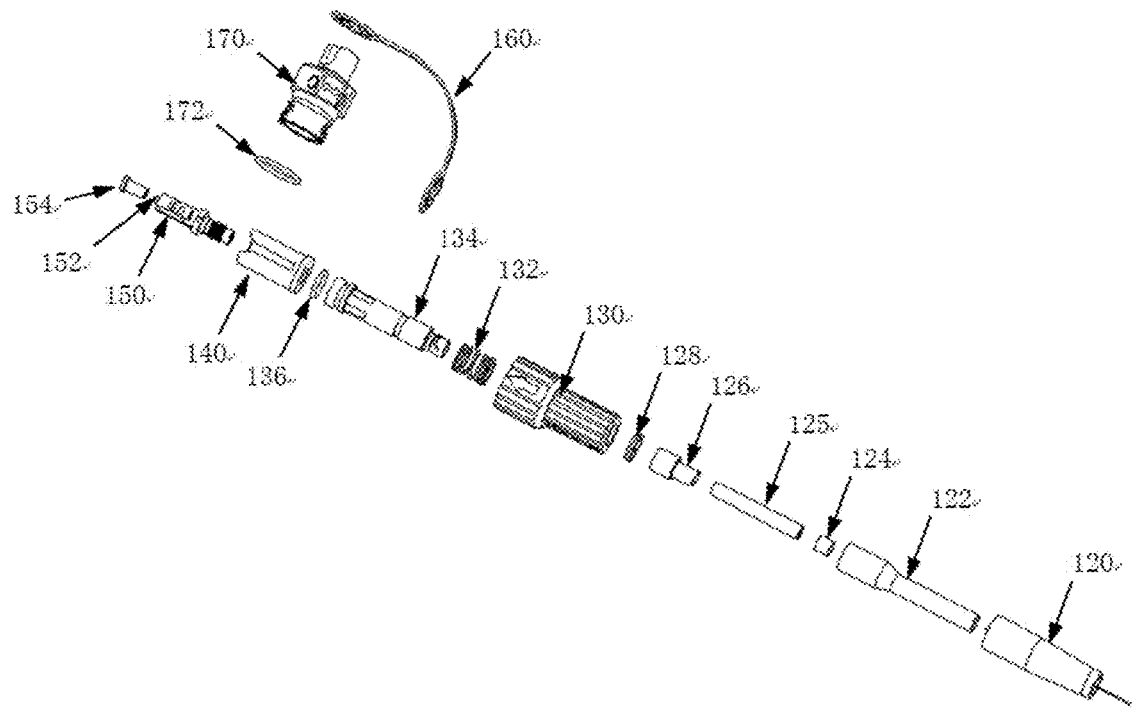
FIG. 4 is a schematic decomposition view of an optical fiber connector according to an embodiment of the present disclosure.

Further, FIG. 4 shows a schematic decomposition view of an optical fiber connector according to an embodiment of the present disclosure. As shown in FIG. 4, the optical fiber connector further includes a tube 122, a sealing ring 124, a sealing tube 125, a crimp ring 126, a snap ring 128, an elastic component 132, a coupling shaft 134, an O-ring 136, a ceramic ferrule 152, a ferrule dustproof cap 154, and an O-ring 172.

In this embodiment of the present disclosure, one end of the connector sub-assembly 150 is fastened to the flat drop cable 110, and a bare fiber extending from the flat drop cable 110 goes through the connector sub-assembly 150.

Figure 5:
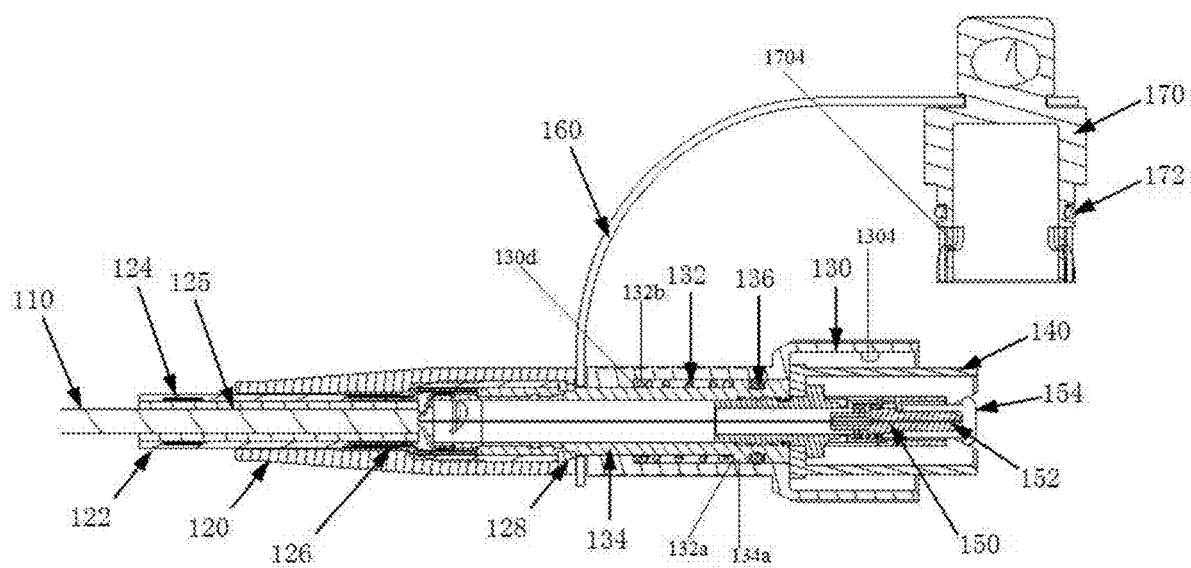
FIG. 5 is a schematic cross-sectional view of an optical fiber connector according to an embodiment of the present disclosure.

As shown in FIG. 5, the elastic component 132 includes two ends 132a and 132b that are set oppositely. One end 132a of the elastic component 132 abuts on a shaft shoulder 134a that is of the coupling shaft 134 and is close to the connector sub-assembly 150. In an implementation manner of the present disclosure, the elastic component 132 is a spring, and the elastic component 132 sleeves the coupling shaft 134. The other end 132b of the elastic component 132 abuts on an inner shaft shoulder 130d of the outer sleeving element 130. The elastic component 132 is configured to provide the outer sleeving element 130 with an elastic force along a direction that goes away from the connector sub-assembly 150, and has a connecting and anti-loosening function.

The rear retainer 120 sleeves the tube 122 and is fastened using the snap ring 128. The rear retainer 120 may be processed first and then sleeve the tube 122, and may also be cast in an integral injection molding manner.

The outer sleeving element 130 sleeves the inner sleeving element 140 and the coupling shaft 134, and may slide forwards and backwards relative to the inner sleeving element 140, and may also rotate relative to the inner sleeving element 140. The outer sleeving element 130 is of a step-shaped circular tube structure. One end of the outer sleeving element 130 forms an inner shaft shoulder 130d inwards, which is configured to abut on the other end 132b of the elastic component 132. An inner wall of the other end of the outer sleeving element 130 is provided with at least one protruding projection 1304, which may also be referred to as a lock point 1304. The projection 1304 may be a cylindrical projection, or a projection in another shape. Certainly, in another implementation manner, the inner wall of the outer sleeving element 130 may be circumferentially provided with two or more projections 1304. When the optical fiber connector is plugged into a fiber adapter, the projection 1304 buckles with a spiral lock groove on the fiber adapter in order to implement a lock connection. In addition, there is an arrow alignment identifier at a front end on the surface of the outer sleeving element 130 in order to indicate connected or unlocked states of the connector, and there is a symmetrical chamfered plane at a rear end, where there are vertical shallow grooves in the chamfered plane in order to facilitate manual operation.

An outer surface of the dustproof cap 170 is provided with at least one chute 1704, and a quantity of chutes 1704 should be the same as a quantity of projections 1304. The chute 1704 is spiral and fits the projection 1304 of the outer sleeving element 130. The chute 1704 extends from one end of the dustproof cap 170 of the connector in a circumferential direction of the dustproof cap 170 of the connector, and a tail end to which the chute 1704 is extended is configured to buckle with the projection 1304. In this implementation manner, the tail end to which the chute 1704 is extended is of an arc matching a shape of the projection 1304. An outer surface of the dustproof cap 170 of the connector is provided with an arrow identifier and identifiers "0" and "1". When the optical fiber connector is plugged into the dustproof cap 170 of the connector, the arrow identifier on the outer sleeving element 130 should be aligned with a position identifier 0 of the dustproof cap 170 of the connector, and the optical fiber connector enters a locked state when rotated to a position of "1" clockwise. The optical fiber connector enters an unlocked state when the outer sleeving element 130 is rotated from the position of "1" to the position of "0" anticlockwise. The dustproof cap 170 is further provided with the O-ring 172 and is tied to the optical fiber connector body outdoors using the rope 160. Before the optical fiber connector is plugged into the fiber adapter, the optical fiber connector may be connected to the dustproof cap 170. The dustproof cap 170 has dustproof and waterproof protective functions.

When the dustproof cap 170 of the connector buckles with the optical fiber connector, the ferrule 152 and the inner sleeving element 140 are plugged into a receptacle of the dustproof cap 170. The projection 1304 of the optical fiber connector slides into the chute 1704 of the dustproof cap 170 of the connector, and the dustproof cap 170 of the connector is rotated in a direction from "0" to "1" such that the projection 1304 slides into the tail end of the chute 1704 in order to implement lock. By performing the foregoing operations, the dustproof cap 170 of the connector buckles with the optical fiber connector.

Figure 13:
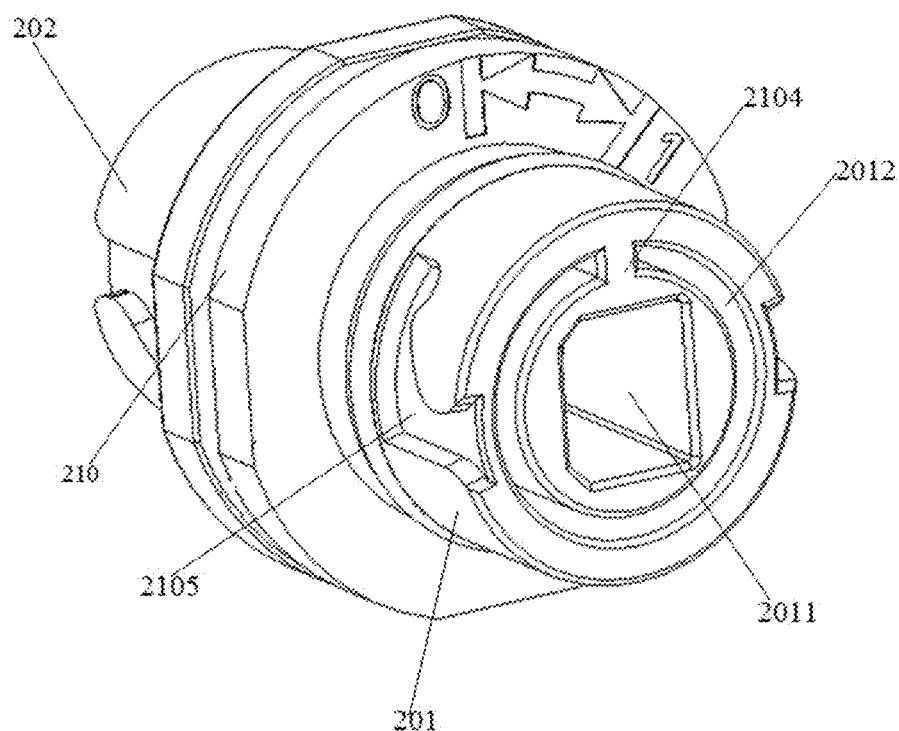
FIG. 13 is a schematic structural diagram of a fiber adapter according to an embodiment of the present disclosure.

As shown in FIG. 5, a front section of an internal structure of the optical fiber connector (the connecting rope 160 in FIG. 5 is used as a line of demarcation, and a part on the right is the front section and a part on the left is a rear section) is a part that combines with the fiber adapter. The connector sub-assembly 150 is threaded to the coupling shaft 134, and the inner sleeving element 140 is sandwiched between the connector sub-assembly 150 and the coupling shaft 134 such that the inner sleeving element 140, the connector sub-assembly 150, and the coupling shaft 134 are fastened together. The inner sleeving element 140 coats the connector sub-assembly 150, and a front end of the inner sleeving element 140 is higher than an end surface of the ceramic ferrule 152 such that it can be avoided that the end surface of the ceramic ferrule 152 is polluted when the optical fiber connector is plugged in or pulled out, or the ceramic ferrule 152 is protected during an accidental fall. The inner sleeving element 140 is provided with an open slot, and the open slot extends from the front end of the inner sleeving element 140 to the middle and even to a position close to a rear end surface. One end of the open slot is in a shape of a horn whose angle is greater than 0 degree and less than 90 degrees. The open slot is configured to allow the optical fiber connector to be plugged into a key 2105 of the adapter (as shown in FIG. 13) when the optical fiber connector is plugged into the fiber adapter such that the optical fiber connector is aligned with the fiber adapter precisely, thereby implementing locating and foolproof functions. The open slot is further described subsequently in combination with the adapter.

The coupling shaft 134 is sleeved by the O-ring 136 having a sealing function, the elastic component 132 having an anti-loosening function, and the outer sleeving element 130 that is outermost. After the optical fiber connector is plugged into the fiber adapter, the elastic component 132 can exert backward stretching force to the outer sleeving element 130 in order to implement the anti-loosening function.

The rear section of the optical fiber connector assembly (the connecting rope 160 in FIG. 5 is used as a line of demarcation, and the part on the left is the rear section) is a part for connecting, fastening, and sealing of a structural part of the optical fiber connector and the optical cable. One end of the connecting rope 160 is stuck at a position close to the middle of the coupling shaft 134, and the other end is connected to the dustproof cap 170. The snap ring 128 is stuck in a groove on the middle and rear part of the coupling shaft 134 and positions the connecting rope 160 and the outer sleeving element 130 in an axial direction.

Figure 6A:
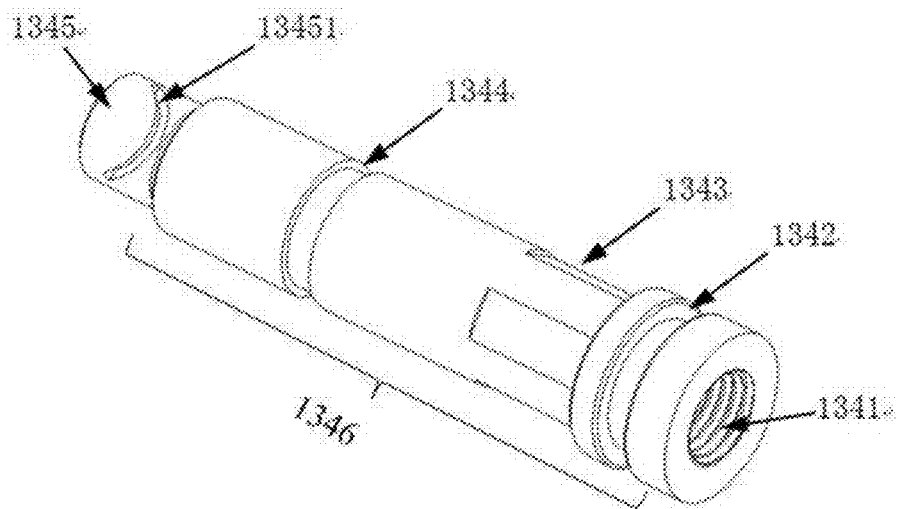
FIG. 6A is a schematic structural diagram of a coupling shaft according to an embodiment of the present disclosure.
Figure 6B:
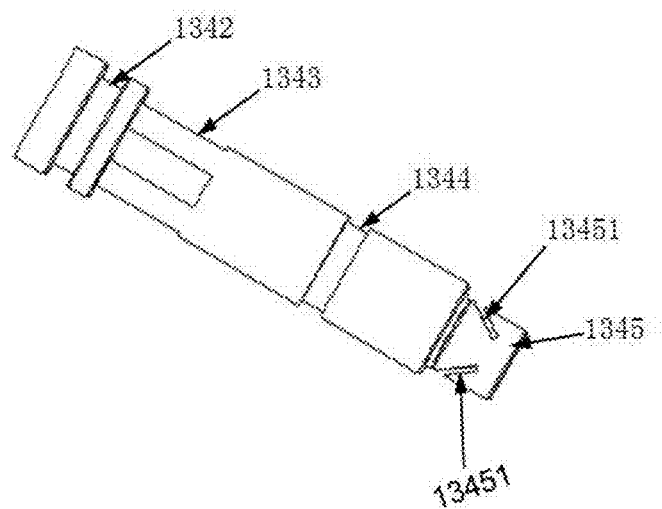
FIG. 6B is a side view of a coupling shaft according to an embodiment of the present disclosure.
Figure 7:
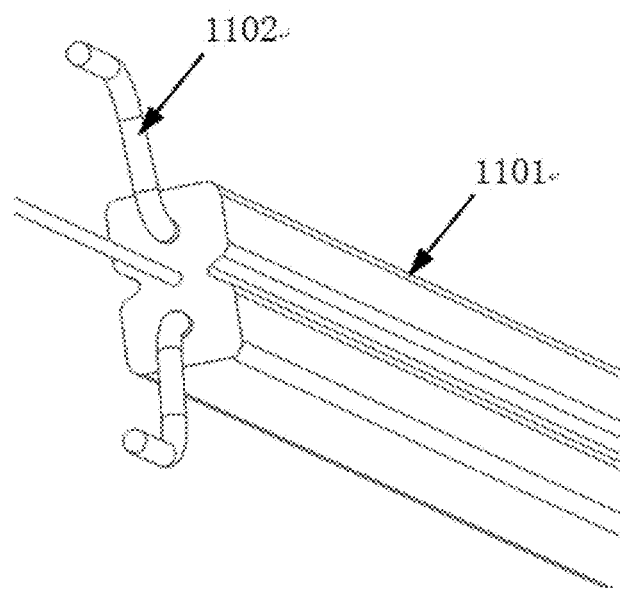
FIG. 7 is a schematic structural diagram of a flat drop cable according to an embodiment of the present disclosure.

FIG. 6A and FIG. 6B are respectively a schematic structural diagram and a side view of the coupling shaft 134. As shown in FIG. 6A, the coupling shaft 134 includes a flange 1345 and a plastic body 1346. The flange 1345 and the plastic body 1346 form an integral part by means of injection molding. An outer surface of the coupling shaft 134 is of a step-shaped column, and an integral structure of the coupling shaft 134 is a three-segment stepped shaft. A front end of the coupling shaft 134 (in FIG. 6A, a part on the right is the front end) is internally provided with a threaded hole 1341 that is configured to connect to an external thread at a rear end of the connector sub-assembly 150, and the inner sleeving element 140 is sandwiched between the connector sub-assembly 150 and the coupling shaft 134 such that the inner sleeving element 140, the connector sub-assembly 150, and the coupling shaft 134 are fastened together. A part of an outer surface of the plastic body 1346 is a chamfered plane 1343, and the chamfered plane 1343 is configured to clamp a wrench when threads are tightened. The coupling shaft 134 is further provided with a groove 1342 configured to mount the O-ring 136. The coupling shaft 134 is further provided with a groove 1344, and the groove 1344 is configured to mount the snap ring 128 that position the connecting rope 160 and the outer sleeving element 130 in the axial direction. The flange 1345 is a fixed connection point, on the structural body of the optical fiber connector, for a strength member 1102 (as shown in FIG. 7) of the flat drop cable 110. The strength member 1102 of the flat drop cable 110 is placed between the crimp ring 126 and the flange 1345, and then the strength member 1102 of the flat drop cable 110 and the coupling shaft 134 are fastened together in a mechanical crimping manner. That is, stretching force received in a process in which the flat drop cable 110 in use is transferred to the coupling shaft 134, that is, transferred to the connector body. A material of the flange 1345 may be a metallic material or a nonmetallic material such as a Kevlar Fiberglass Reinforced Plastic (KFRP).

Figure 9A:
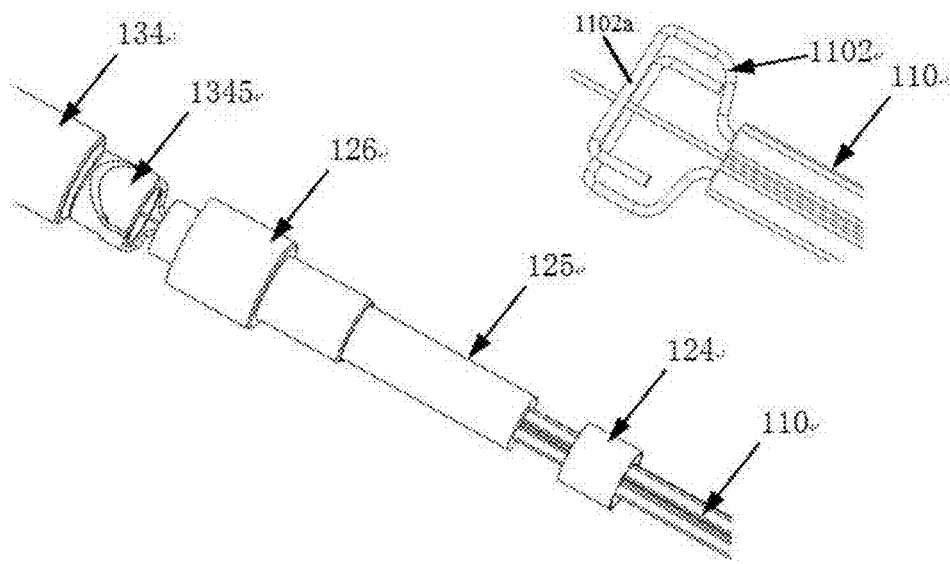
FIG. 9A is a schematic structural diagram of hooking between a coupling shaft and a flat drop cable according to an embodiment of the present disclosure.
Figure 9B:
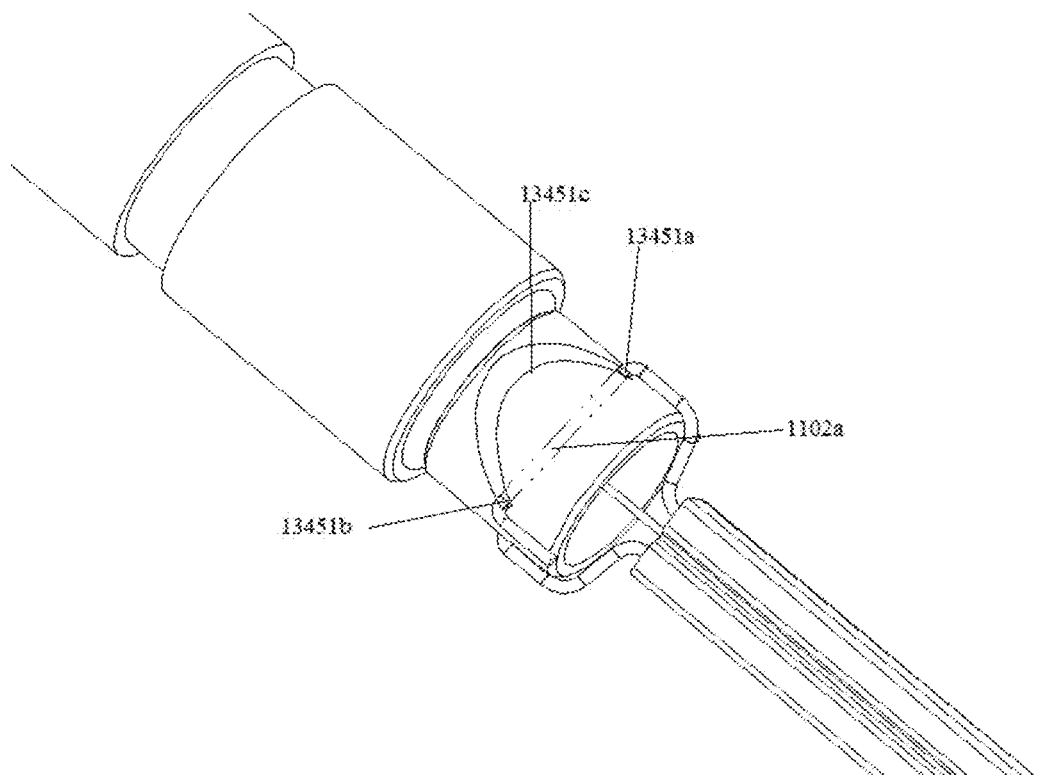
FIG. 9B is a locally enlarged schematic diagram of hooking between a coupling shaft and a flat drop cable.
Figure 9C:
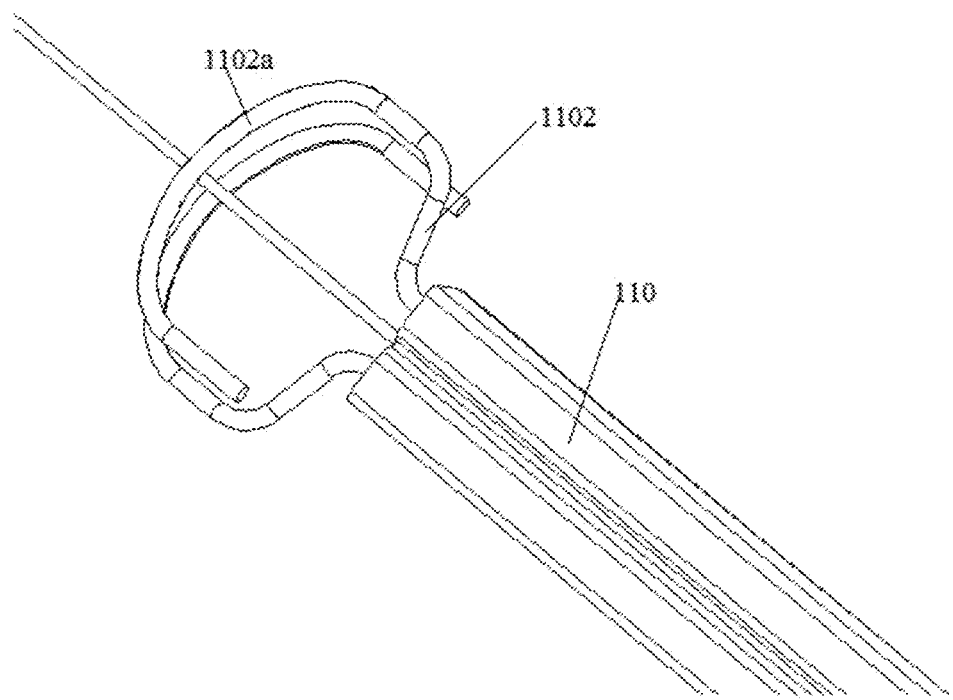
FIG. 9C is a schematic structural diagram of another flat drop cable after bending according to an embodiment of the present disclosure.
Figure 9D:
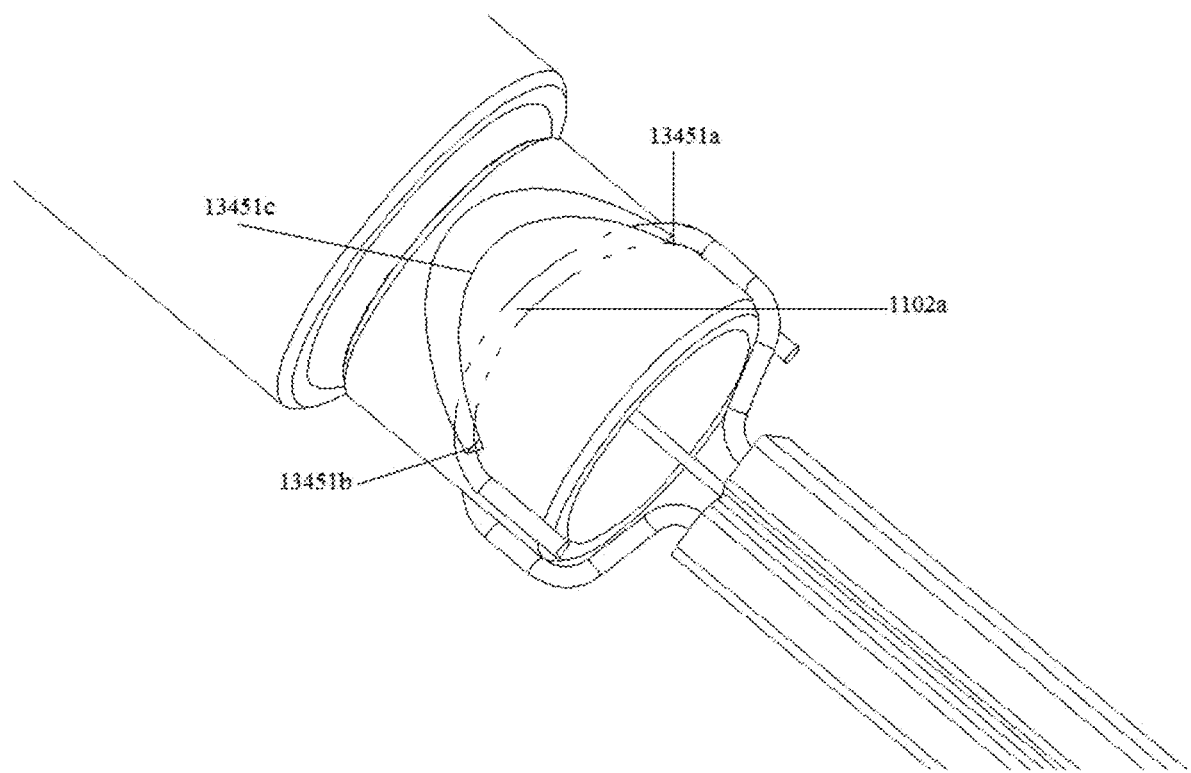
FIG. 9D is a locally enlarged diagram of another type of hooking between a coupling shaft and a flat drop cable according to an embodiment of the present disclosure.
Figure 10:
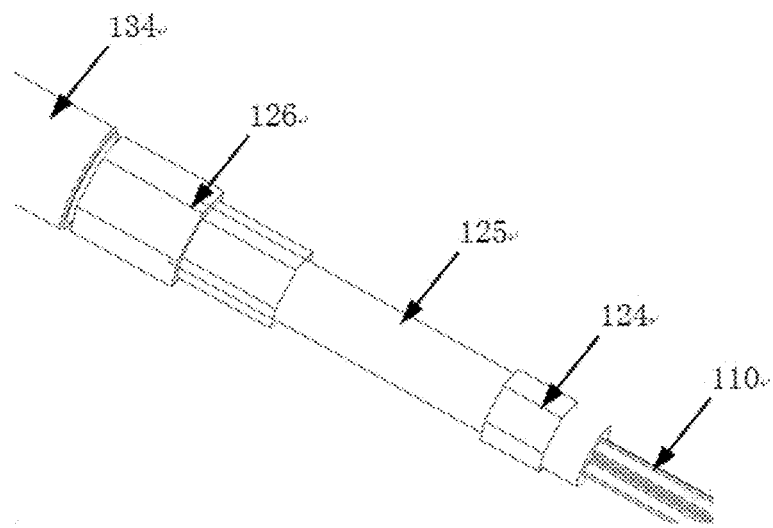
FIG. 10 is a schematic diagram of a procedure of manufacturing an optical fiber connector according to an embodiment of the present disclosure.

The flange 1345 is provided with at least one hook groove 13451. As shown in FIG. 6B, in this embodiment of the present disclosure, that the flange 1345 has two hook grooves 13451 is used as an example. When viewed from the front, the hook groove 13451 is a groove formed by cutting the flange 1345 and having an arc-shaped opening. Two end points of the opening are 13451*a* and 13451*b*, and an arc-shaped edge of the opening is 13451*c* (as shown in FIG. 9B and FIG. 9D). A bottom of the opening is located above a bottom of the flange 1345 and is preferably in the middle. As shown in FIG. 7, the flat drop cable 110 in the present disclosure is a flat drop cable. A cross section of an optical cable sheath 1101 of the flat drop cable 110 is 8-shaped, and two sides of the flat drop cable 110 are provided with grooves. A bare fiber is in a center of the flat drop cable 110 and connected to the ceramic ferrule 152 of the connector sub-assembly 150. A traditional manner of direct riveting has no fastening function, and only a relatively low stretching resistance value can be reached in a manner of riveting or clamping the sheath of the flat drop cable. In the present disclosure, the flange 1345 is provided with hook grooves 13451, and two strength members 1102 of the flat drop cable 110 are bent (shapes of the bent strength members are shown in FIG. 9A or FIG. 9C) and hooked in the hook grooves 13451, and then sleeved by the crimp ring 126 for mechanical crimping, as shown in FIG. 9A to FIG. 10. In this way, the strength members 1102 of the flat drop cable 110 are fastened to the coupling shaft 134 firmly, thereby reaching a relatively high stretching resistance value.

Figure 8:
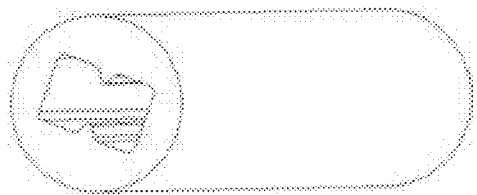
FIG. 8 is a schematic structural diagram of a tube fitting a flat drop cable according to an embodiment of the present disclosure.

According to FIG. 7, it may be known that the cross section of the flat drop cable 110 is 8-shaped, and each of the two sides of the flat drop cable 110 has a thin groove. When a tail portion of the connector is sealed, a traditional sealing ring or heat shrink tubing cannot be used for sealing. In this embodiment of the present disclosure, the sealing tube 125 (as shown in FIG. 8) made of an elastic material is used. The sealing tube 125 has a circular outer surface and may be sealed using the traditional sealing ring or heat shrink tubing. A bore of the sealing tube 125 is an 8-shaped through hole matching the shape and size of the cross section of the flat drop cable 110. When in use, an outer surface of the flat drop cable 110 is first coated with a layer of sealant, and the sealing tube 125 sleeves the flat drop cable 110, implementing bonding and sealing using the sealant. To prevent a failure of the sealant, in this embodiment of the present disclosure, a sealing ring 124 further sleeves the sealing tube 125, and as shown in FIG. 9, the sealing tube 125 and the flat drop cable 110 are fastened together in a mechanical crimping manner. According to this embodiment of the present disclosure, in a dual sealing manner of sealant plus mechanical crimping between the sealing tube 125 and the flat drop cable 110, a good sealing effect and reliability are achieved. An outer surface of the sealing tube 125 is of a smooth and regular circle and may be sealed using the traditional sealing ring or heat shrink tubing.

Figure 11:
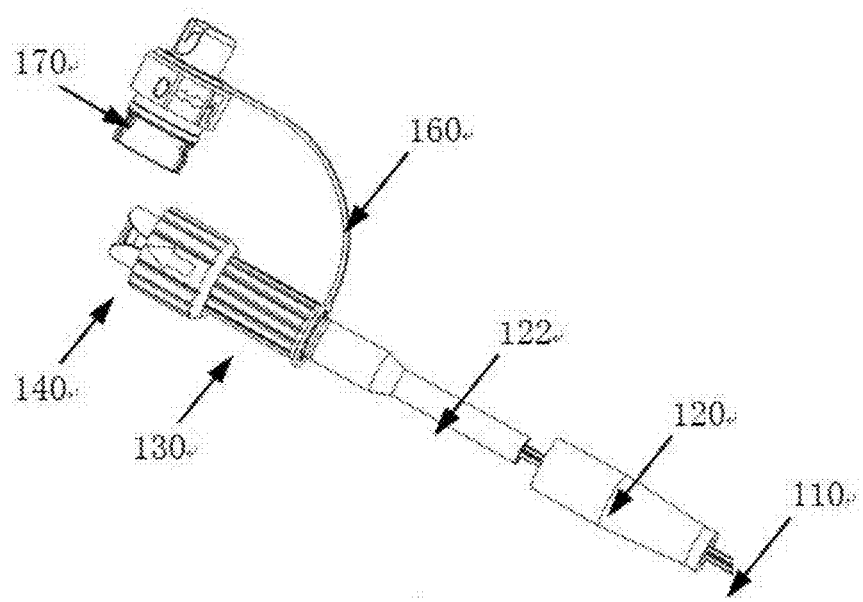
FIG. 11 is a schematic diagram of another procedure of manufacturing an optical fiber connector according to an embodiment of the present disclosure.
Figure 12:
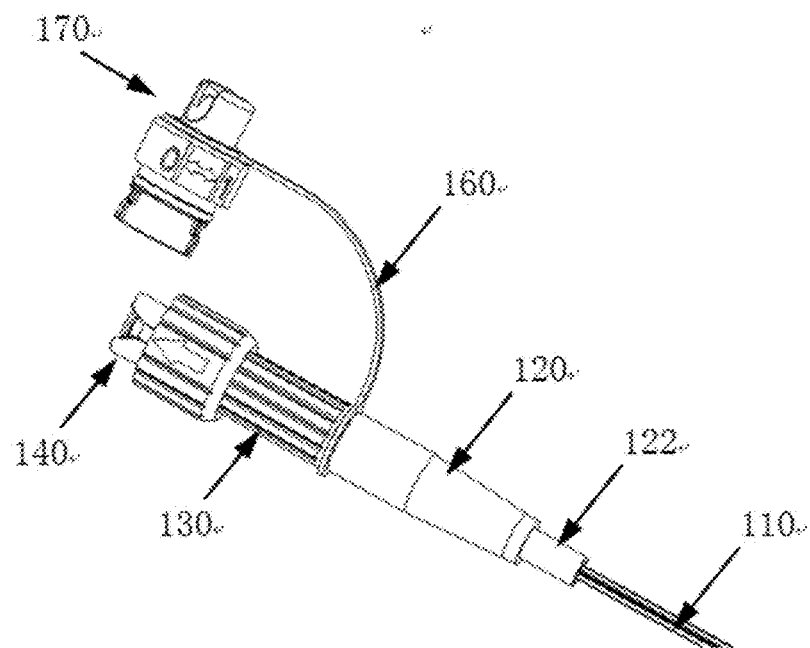
FIG. 12 is a schematic diagram of another procedure of manufacturing an optical fiber connector according to an embodiment of the present disclosure.

FIG. 9A to FIG. 12 are illustrations of specific implementation steps of a stretching resistance structure and a sealing manner between the flat drop cable 110 and the optical fiber connector according to the present disclosure. FIG. 9A shows that two strength members 1102 of the flat drop cable 110 are bent into hooks, one side 1102a of each of the hooks is configured to directly sit on the bottom of the opening of the hook groove 13451 of the coupling shaft 134, and the hooks are mounted to the hook grooves 13451 on two sides of the flange 1345 of the coupling shaft 134. The sealing tube 125 and the flat drop cable 110 are also bonded together by a sealant. FIG. 9B, FIG. 9C, and FIG. 9D are locally enlarged schematic diagrams of hooking between the flange 1345 of the coupling shaft 134 and the flat drop cable 110. In an implementation manner, as shown in FIG. 9B, two sides 1102a of the bent strength members of the flat drop cable 110 are parallel to each other. In this case, the bottoms of the hook grooves 13451 are also of straight lines such that the hook grooves 13451 are closely fitted with the strength members 1102, where the bottoms of the hook grooves 13451 are of lines formed by two end points and a circumference of the flange 1345. In another implementation manner, as shown in FIG. 9C, the bent strength members 1102 of the flat drop cable 110 may also be arc-shaped. In this case, the bottoms of the hook grooves 13451 hooked by the arc-shaped flat drop cable 110 are also arc-shaped such that the hook grooves 13451 are closely fitted with the strength members 1102. The bottoms are of lines formed by two end points of the hook grooves 13451 and the flange 1345. FIG. 10 shows that, the crimp ring 126 sleeves the flange 1345 that has been hooked by the strength members 1102, and mechanical crimping is performed in order to perform dual stretching resistance and fastening on the flat drop cable 110 and the coupling shaft 134, and then, the sealing ring 124 sleeves the tail portion of the sealing tube 125, and mechanical crimping is performed in order to perform dual sealing on the flat drop cable 110 and the sealing tube 125. FIG. 11 shows that, after the crimp ring 126 and the sealing ring 124 are crimped, a tube 122 with a sealant sleeves the sealing tube 125 and then the coupling shaft 134, and then heat shrinkable sealing is performed. In this manner, the flat drop cable 110 and the optical fiber connector are completely sealed. As shown in FIG. 12, after sleeving of the rear retainer 120, an entire manufacturing procedure of the tail portion of the optical fiber connector of the flat drop cable 110 is completed.

Figure 14:
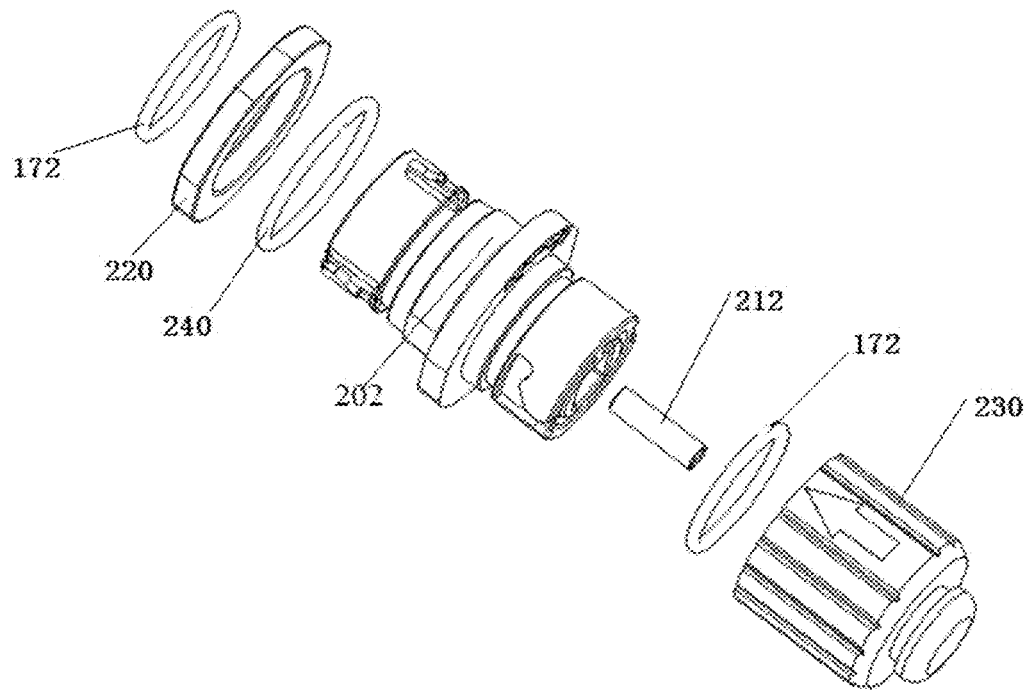
FIG. 14 is a schematic exploded view of a fiber adapter according to an embodiment of the present disclosure.

As shown in FIG. 13 and FIG. 14, the fiber adapter includes two sockets 201 and 202 and a ceramic tube 212 that is placed in a center.

The socket 201 is provided with an optical fiber slot 2011 and an inner sleeving element slot 2012. The optical fiber slot 2011 and the inner sleeving element slot 2012 extend axially along the socket 201. The optical fiber slot 2011 engages with the connector sub-assembly 150, and the inner sleeving element slot 2012 engages with the inner sleeving element 140. The inner sleeving element slot 2012 is provided with a locating key 2104. When the optical fiber connector is plugged into the fiber adapter, the C-shaped inner sleeving element 140 engages with the locating key 2104 and is plugged into the inner sleeving element slot 2012. In this implementation manner, the sockets 201 and 202 are cylindrical. The optical fiber slot 2011 is a square slot. A cross section of the inner sleeving element slot 2012 is C-shaped in order to fit the inner sleeving element 140.

A periphery of the optical fiber socket 201 is provided with a chute 2105. The chute 2105 is spiral and extends from one end of the socket 201 in a circumferential direction of the socket 201, and a tail end of the extension of the chute 2105 buckles with the projection 1304. In this implementation manner, the chute 2105 and the chute 1704 have a same shape.

As shown in FIG. 14, the fiber adapter includes an O-ring 172, a locking nut 220, an O-ring 240, a socket body 210 (as shown in FIG. 13), and a ceramic tube 212. The O-ring 240, the locking nut 220, and the O-ring 172 sequentially sleeve the socket body 210. The ceramic tube 212 is plugged into the other end of the socket body 210, and is fastened using the O-ring 172.

Figure 15:
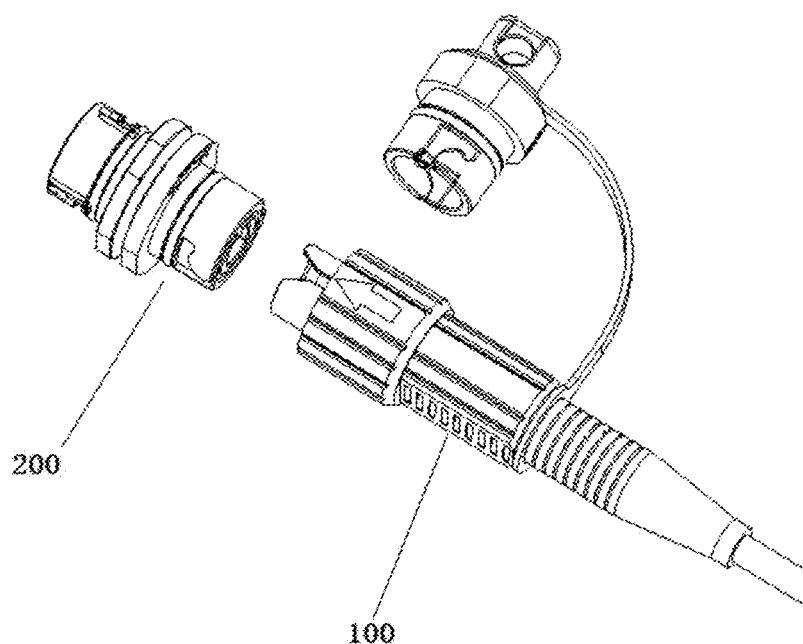
FIG. 15 is a schematic structural diagram of fitting between a fiber adapter and an optical fiber connector according to an embodiment of the present disclosure.

The fiber adapter includes an adapter dustproof cap 230. One end of the adapter dustproof cap 230 is provided with an adapter receptacle that receives the fiber adapter 200 as shown in FIG. 15. The adapter receptacle is provided with a projection, and the projection is slidably connected to the chute 2105.

When the optical fiber connector is plugged into the optical fiber slot 201, the inner sleeving element 140 is plugged into the inner sleeving element slot 2012 such that the connector sub-assembly 150 is plugged into the optical fiber slot 2011. The projection 1304 of the optical fiber connector slides into the chute 2105 of the fiber adapter. The outer sleeving element 130 is rotated such that the projection 1304 slides into the tail end of the chute 2105 in order to implement locking.

In the optical fiber connector provided in the embodiments of the present disclosure, a cost-effective flat drop cable is used, which can achieve a stretching resistance of 100 N and implement an Ingress Protection Rating of IP67, and can be applied to an outdoor environment. Moreover, the optical fiber connector provided in the embodiments of the present disclosure implements plug-and-play, supports blind-mate, and is easy to operate, auxiliary alignment design provides more convenience to a field operation, and time for inserting and removing a connector is only ⅕ of time for inserting and removing an ordinary thread connector. Further, the optical fiber connector provided in the embodiments of the present disclosure has good anti-vibration and anti-loosening effects, thereby improving long-time reliability of the connector. Lastly, the optical fiber connector provided in the embodiments of the present disclosure is provided with a ferrule-protected structure that prevents an end surface of the ferrule from coming into contact with another component, thereby protecting the end surface of the ferrule from being polluted, or protects, during an accidental fall, the ferrule from being damaged due to a crash.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An optical fiber connector, comprising:
   a flat drop cable;
   a connector sub-assembly comprising a ceramic ferrule, wherein one end of the connector sub-assembly is configured to be fastened to the flat drop cable;
   a coupling shaft, wherein the coupling shaft is step-shaped and comprises:
      a flange; and
      a plastic body, wherein a first end of the plastic body is provided with an internal thread configured to connect to an external thread of the connector sub-assembly, wherein the flange is located at a second end of the plastic body opposite the first end and is provided with at least one hook groove, wherein the at least one hook groove is an opening cut in an outside surface of the flange, wherein the opening has an arc-shaped edge, and wherein a strength member inside the flat drop cable is separated from the flat drop cable on the end of the flat drop cable and bent to hook the at least one hook groove;
   an elastic component configured to sleeve the coupling shaft;
   an inner sleeving element configured to accommodate the connector sub-assembly, wherein one end of the inner sleeving element is higher than an end surface of the ceramic ferrule, and wherein the inner sleeving element is provided with an open slot such that a cross section of the inner sleeving element is C-shaped; and
   an outer sleeving element, wherein the outer sleeving element is configured to sleeve the inner sleeving element, wherein the outer sleeving element is capable of sliding forwards and backwards relative to the inner sleeving element, wherein one end of the outer sleeving element forms an inner shaft shoulder inwards, which is configured to abut on the other end of the elastic component, and wherein an inner wall of the outer sleeving element is provided with at least one protruding projection configured to buckle with an adapter when the optical fiber connector is plugged into the adapter.

2. The optical fiber connector of claim 1, wherein the coupling shaft is sleeved by an O-ring having a sealing function.

3. The optical fiber connector of claim 2, wherein the coupling shaft is further provided with a groove configured to mount the O-ring.

4. The optical fiber connector of claim 1, wherein the coupling shaft is further provided with a chamfered plane, and wherein the chamfered plane is configured to clamp a wrench when threads are tightened.

5. The optical fiber connector of claim 1, wherein the coupling shaft is further provided with a second groove, and wherein the second groove is configured to mount a snap ring positioning the outer sleeving element.

6. The optical fiber connector of claim 1, further comprising a sealing tube, and wherein the sealing tube comprises an elastic material and is configured to seal the cable.

7. The optical fiber connector of claim 6, wherein an outer surface of the sealing tube is cylindrical, and wherein a cross section of a bore of the sealing tube is 8-shaped.

8. The optical fiber connector of claim 6 wherein an outer surface of the cable is coated with sealant, wherein the cable is sleeved by the sealing tube, and wherein a sealing ring sleeves the sealing tube to fasten the sealing tube and the cable.

9. The optical fiber connector of claim 1, further comprising a dustproof cap, wherein the dustproof cap is connected to an optical fiber connector body using a connecting rope, and wherein an outer surface of the dustproof cap is provided with at least one chute, which is configured to allow the at least one protruding projection to slide into the at least one chute when the optical fiber connector is plugged into the dustproof cap to implement locking.

10. An optical fiber connector, comprising:
    a flat drop cable comprising a strength member separated from the flat drop cable on an end of the flat drop cable and bent in a hook;
    a connector sub-assembly comprising a ceramic ferrule, wherein one end of the connector sub-assembly is configured to be fastened to the flat drop cable;
    a coupling shaft comprising:
       a flange comprising at least one hook groove comprising an arc-shaped edge and configured to hook the hook of the flat drop cable; and
       a plastic body, wherein a first end of the plastic body is provided with an internal thread configured to connect to an external thread of the connector sub-assembly, wherein the flange is located at a second end of the plastic body opposite the first end;
    an elastic component configured to sleeve the coupling shaft;
    an inner sleeving element configured to accommodate the connector sub-assembly; and
    an outer sleeving element, wherein the outer sleeving element is configured to sleeve the inner sleeving element.

11. The optical fiber connector of claim 10, wherein the coupling shaft is sleeved by an O-ring having a sealing function.

12. The optical fiber connector of claim 11, wherein the coupling shaft is further provided with a groove configured to mount the O-ring.

13. The optical fiber connector of claim 10, wherein the coupling shaft is further provided with a chamfered plane, and wherein the chamfered plane is configured to clamp a wrench when threads are tightened.

14. The optical fiber connector of claim 10, wherein the coupling shaft is further provided with a second groove, and wherein the second groove is configured to mount a snap ring positioning the outer sleeving element.

15. The optical fiber connector of claim 10, further comprising a sealing tube, and wherein the sealing tube comprises an elastic material and is configured to seal the cable.

16. The optical fiber connector of claim 15, wherein an outer surface of the sealing tube is cylindrical, and wherein a cross section of a bore of the sealing tube is 8-shaped.

17. The optical fiber connector of claim 15, wherein an outer surface of the cable is coated with sealant, wherein the cable is sleeved by the sealing tube, and wherein a sealing ring sleeves the sealing tube to fasten the sealing tube and the cable.

18. The optical fiber connector of claim 10, further comprising a dustproof cap, wherein the dustproof cap is connected to an optical fiber connector body using a connecting rope, and wherein an outer surface of the dustproof cap is provided with at least one chute, which is configured to allow the at least one protruding projection to slide into the at least one chute when the optical fiber connector is plugged into the dustproof cap to implement locking.

19. The optical fiber connector of claim 10, wherein one end of the inner sleeving element is higher than an end surface of the ceramic ferrule, and wherein the inner sleeving element is provided with an open slot such that a cross section of the inner sleeving element is C-shaped.

20. The optical fiber connector of claim 19, wherein the outer sleeving element is capable of sliding forwards and backwards relative to the inner sleeving element, wherein one end of the outer sleeving element forms an inner shaft shoulder inwards, which is configured to abut on the other end of the elastic component, and wherein an inner wall of the outer sleeving element is provided with at least one protruding projection configured to buckle with an adapter when the optical fiber connector is plugged into the adapter.

* * * * *